Dec. 11, 1951           G. AGINS           2,577,942
ANTIFRICTION SUPPORT FOR GYROSCOPES AND THE LIKE
Filed Oct. 16, 1948           2 SHEETS—SHEET 1
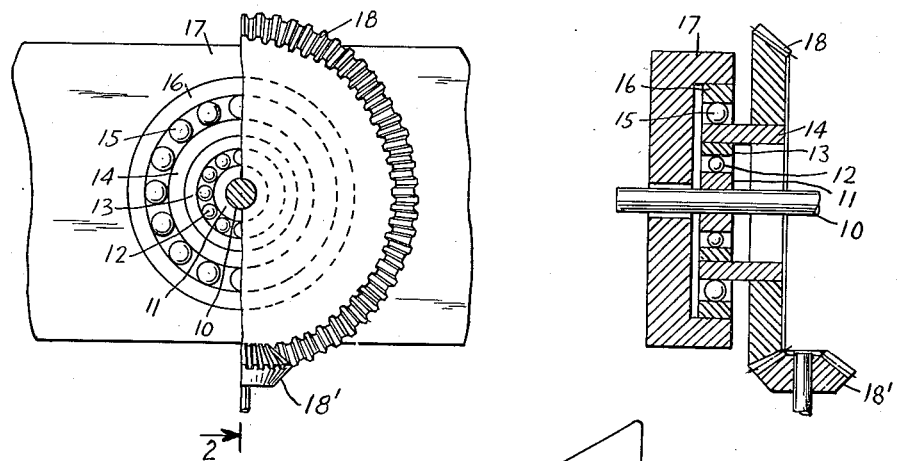
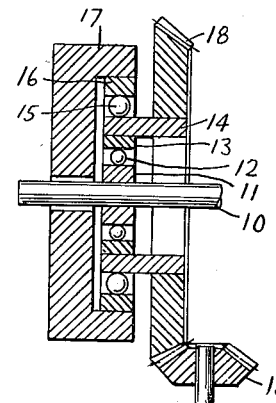
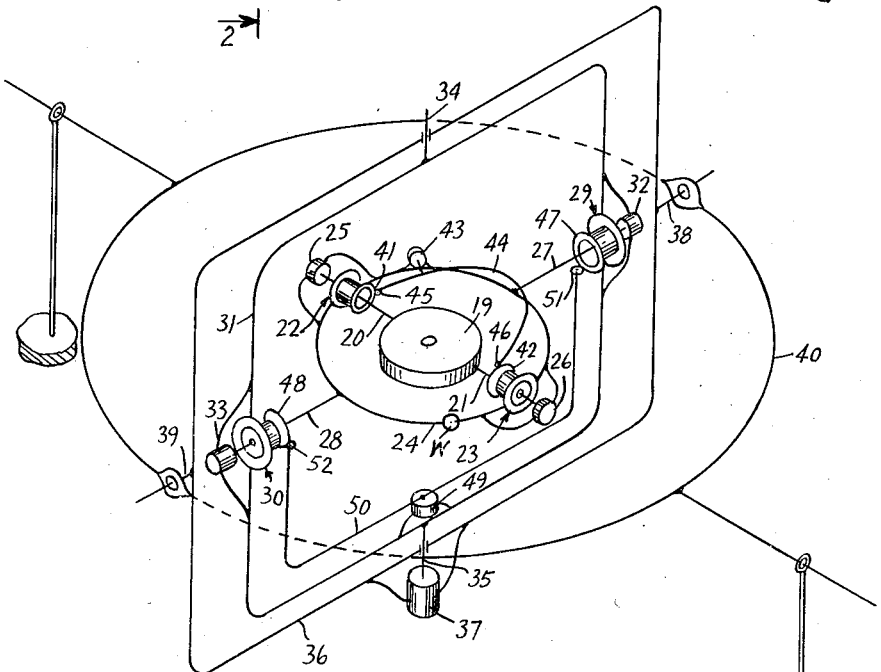
INVENTOR
GEORGE AGINS
BY
his ATTORNEYS Patented Dec. 11, 1951

2,577,942

UNITED STATES PATENT OFFICE 2,577,942

ANTIFRICTION SUPPORT FOR GYROSCOPES AND THE LIKE

George Agins, Brooklyn, N. Y., assignor to Arma Corporation, Brooklyn, N. Y., a corporation of New York Application October 16, 1948, Serial No. 54,974

5 Claims. (Cl. 74—5)

This invention relates to an antifriction support for gyroscopes and other universally supported instruments, and has particular reference to means for averaging to zero the precession caused by the friction of the supporting bearings of gyroscopes, although the invention is not limited to that use.

It is well known that the operating accuracy of gyroscopic instruments, such as the stable element depends on the degree to which the precessional errors caused by friction in the bearings of the two suspension axes arranged mutually perpendicularly to the axis of the spinning wheel of the gyroscope, have been eliminated. For optimum accuracy, the spin axis of the gyroscope wheel should be supported about the two mutually perpendicular axes by frictionless or perfect ball bearings. But even with the highest precision type of ball bearing, the total elimination of friction is never achieved since the bearing balls are practically never perfectly round and uniformly smooth, nor are the ball races always perfectly smooth, concentric or free of foreign matter. Accordingly, a non-uniform bearing contact occurs between the balls and the races which manifests itself as a static friction drag imposing restraint on the freedom of the gyroscope, thereby causing precession of the spin axis of the gyroscope, and consequent error in the instrument utilizing the gyroscope as an element.

It has been proposed in Fieux Patent No. 1,845,592 issued February 16, 1932, that the similar frictional drag in ball bearings caused by minute foreign bodies like dust particles may be reduced by rotating the spindles of the ball bearings at a sufficient speed to obtain a uniform resistance to rolling and in a direction to neutralize practically the driving effects on the suspended element which is a gyroscope whose opposite trunnion bearing spindles are driven in opposite directions by shafting and bevel gearing from the rotor of the gyroscope. Although this proposal for reducing ball bearing friction is theoretically possible of realization, it cannot be realized in actual practice because it assumes that two ball bearings mounted on the same shaft and rotated in opposite directions in space possess equal frictional properties, which does not take into account the aforementioned inherent frictional drag due to manufacturing irregularities. Furthermore, even if it were possible to produce bearings of equal frictional properties they would not long maintain that equality under all conditions of use and misuse, lubrication, wear, age, temperature changes and other factors, but would soon vary because of the reasons mentioned, including those assigned by Fieux. Hence mere rotation of the spindles of ball bearings, rather than eliminating the errors due to friction, may introduce a greater error by the use of rotating ball bearings in which the resultant "driving force" or frictional torque about the supporting shaft is not completely neutralized, causing precession of the gyroscope in a fixed direction.

In accordance with the present invention, the precession of a gyroscope due to friction in the suspension bearings of the gyroscope, is averaged to zero. The supporting shafts of a gyroscopic element and its inner gimbal ring, for example, are journaled in compound bearings constructed by securely fitting one ball bearing over the periphery of a smaller ball bearing and then continuously rotating the connected or common races of the two bearings while simultaneously rotating the inner gimbal system about a vertical axis, this inner gimbal system being supported in an outer gimbal ring or support which is stationary relatively to the inner gimbal system in that it is not rotated, among other reasons.

In a preferred embodiment of the invention, as applied to a gyro-stable element, for example, a vertical axis gyroscope and its supporting inner gimbal ring are rotated about a vertical axis in the outer gimbal system, and the opposite coaxial shafts supporting the gyroscope casing on the inner gimbal ring about one axis, as well as the opposite coaxial shafts supporting the inner gimbal ring on the outer gimbal ring about the coordinate axis, are provided with the compound concentric ball bearings described, with their common or connected races continuously and positively driven, so that as the inner gimbal system rotates bodily about its vertical axis, the aforementioned inner gimbal system compound ball bearing races are simultaneously rotated.

One of the driven races of each compound bearing, preferably the race of the outer ball bearing, is fitted with a bevel gear engaged by a bevel pinion driven by a flexible shaft from a motor carried by the rotating inner gimbal system frame. Preferably, each of these bevel pinions is driven by the same flexible shaft, so that the driven races of the opposite compound bearings are continuously rotated.

It will be seen that the joint action of the compound ball bearing rotation and the inner gimbal system rotation neutralizes the effect of bearing friction acting on the gyroscope by averaging the precession of the gyroscope due to friction in the suspension bearings, to zero whereby, in effect, a frictionless support for the gyroscope is obtained, notwithstanding the inherent unequal friction between the best of matched bearings due to manufacturing inequalities.

For a more complete understanding of the invention, reference may be had to the accompanying drawings, in which:

Figure 1 illustrates an elevation view of the compound ball bearing of this invention with the bevel gear broken half away to show the bearing construction;

Fig. 2 is a cross-sectional view of the compound ball bearing, as seen along the line 2—2 of Fig. 1;

Fig. 3 is a schematic perspective illustration of a stable element in part, showing an application of the present invention.

Figure 4:
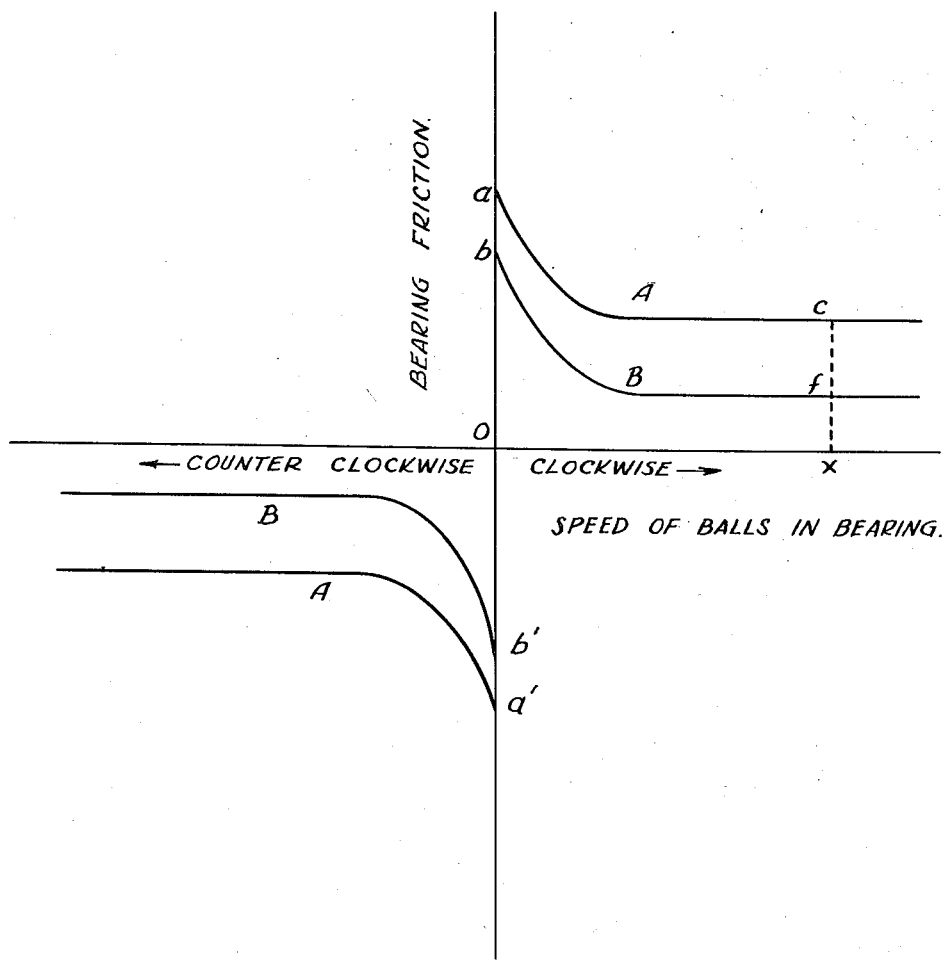
Fig. 4 is a graph showing the relation between friction and speed of the balls in a ball bearing.

Referring to Figs. 1 and 2 of the drawings, numeral 10 designates the supporting shaft extension or journal of a gyroscope or its gimbals. The inner or journal bearing consists of the inner race 11 securely mounted on journal 10 and engaged by bearing balls 12 encircled by the outer race 13. This bearing 11, 12, 13 is telescoped within the outer or housing bearing consisting of the inner race 14, bearing balls 15, and outer race 16. The inner race 14 of the outer or housing bearing securely fits the periphery of the outer race 13 of the inner or journal bearing, whereas the outer race 16 of the outer or housing bearing is supported in the housing of frame 17. Races 13 and 14, thus united, become a unitary or common race for both bearings and may be made in one piece if desired.

As is shown especially in Fig. 2, the outer or housing bearing has its inner race 14 extended laterally, tubularly, and to the extending portion thereof is secured, preferably by a press fit, the bevel drive gear 18. Alternatively, gear 18 can be secured to race 14 by using a well-known ball bearing having an adapter sleeve. The drive gear 18 of the compound ball bearing thus constructed is arranged to be continuously revolved by a meshing pinion 18' rotated by a motor carried by the supporting frame 17, as will be described.

The preferred mode of incorporating the compound ball bearing just described in the well-known stable element is schematically illustrated in Fig. 3. It includes the conventional gyroscope 19 having a spinning wheel whose axis is normally vertical, journalled in a casing supported by aligned opposite shafts or journals 20 and 21 respectively journaled in like compound ball bearings 22 and 23, carried in the inner gimbal ring 24 and constructed as illustrated in Figs. 1 and 2. The extension of shaft 20 is secured to the rotor of the torque motor 25 carried by the inner gimbal ring 24, and the extension of shaft 21 is secured to the rotor of electrical pick-up device 26 carried by the inner gimbal ring 24. The torque motor 25 and pick-up device 26 are of known construction and since they form no part of the present invention, they need not be further described.

The supporting shafts or journals 27 and 28 of inner gimbal ring 24 are journalled near their outer ends in similar compound ball bearings 29 and 30, respectively, which are carried in the vertical gimbal frame 31 and which are constructed as illustrated in Figs. 1 and 2. The extension of shaft 27 is secured to the rotor of an electrical pick-up device 32 similar to pick-up device 26 and carried by the vertical rotating frame 31, while the extension of shaft 28 is secured to the rotor of a torque motor 33 similar to torque motor 25 and carried by the vertical gimbal rotating frame 31.

The vertical gimbal rotation frame 31 is supported by vertical shafts 34 and 35, journalled in the outer vertical frame 36. The outer vertical frame 36 carries the gimbal rotation motor 37, which provides rotation of vertical gimbal rotation frame 31 about the axis through the shafts 34 and 35. The outer vertical frame 36 is supported by shafts 38 and 39, journalled in bearings supported by the outer gimbal ring 40. The required follow-up motors, coordinate transformers, roll and pitch pendulums and self-synchronous generators, are not necessary to an understanding of the present invention, and hence are not shown, but if their construction and operation are of interest, reference may be had to applicant's copending application Serial No. 738,242, filed March 29, 1947, which discloses the same.

Referring now to the application of the compound ball bearing of Figs. 1 and 2 to the stable element shown in Fig. 3, the bevel gears 41 and 42 corresponding to gear 18 in Figs. 1 and 2 are secured to the common races of compound ball bearings 22 and 23 and are driven by respective pinions 45 and 46, corresponding to pinion 18' in Figs. 1 and 2. These pinions 45 and 46 are in turn driven by flexible cable shaft 44 driven by electric motor 43 carried by the inner gimbal ring 24. It is to be understood that the addition of the motor 43 as shown, may require a balance weight W to be placed on the inner gimbal ring 24, so that the elements carried by the gimbal ring 24 will be weighted in neutral equilibrium about the axis through the bearings 29 and 30. Alternatively, the motor 43 may be supported by the inner gimbal ring 24 at shaft 27 instead of off-center as shown in Fig. 3, thereby not disturbing the initial balance and making counterbalancing weight W unnecessary.

Similarly, the gears 47 and 48, corresponding to gear 18 of Figs. 1 and 2, are secured to the compound ball bearings 29 and 30, and an electric motor 49, carried by the vertical gimbal rotation frame 31, drives the flexible cable shaft 50, connected to the bevel pinions 51 and 52 which mesh respectively with the compound ball bearing gears 47 and 48, thereby rotating the connected races of compound ball bearings 29 and 30.

Although the rotation to the connected races of the compound ball bearings 22, 23, 29 and 30 are shown transmitted by means of bevel gears, it will be understood that other suitable means can be used with equal facility, such as spur gears, or friction disc and roller drives and the like. Also, although the connected races of the opposite bearing are rotated in opposite directions by the driving mechanism shown, they may be rotated in the same direction without impairing their contribution to the neutralization of bearing friction according to the invention.

In considering the manner in which the compound ball bearing of the present invention functions to stabilize the friction in the gimbal bearings of a vertical spin axis gyroscope, reference may be had to Fig. 4 in which curves A and B represent the bearing friction as a function of the speed of the balls in the bearing and indicate that friction decreases with speed from some value at zero speed, known as the static friction, to a lower and substantially constant value, known as kinetic friction. Although the laws of friction in a ball bearing have not yet been definitely established, the general behavior is known to be such as are shown by curves A and B of Fig. 4, and they will serve to illustrate the points to be discussed.

Assuming that in bearings 22 and 23 the connected races corresponding to 13, 14 of Figs. 1 and 2, are held stationary in relation to gimbal ring 24, and that the inner bearing balls of bearing 22 have the characteristic shown by curve A in Fig. 4, while the inner bearing balls of bearing 23 have the characteristic shown by curve B of Fig. 4, any disturbance resulting in the oscillation of gimbal ring 24 about shafts 20 and 21 applies a frictional torque to the gyroscope 19 about the axis through shafts 20 and 21 proportional to $oa+ob'$ (or $oa'+ob$ depending on the direction of rotation) thus causing unwanted precession of the spin axis of the gyroscope 19 out of the true vertical.

Similarly when the connected races of bearings 29 and 30 are held stationary with respect to vertical frame 31, the friction in the ball bearings used to support shafts 27 and 28 of gimbal ring 24 results in precession of the gyroscope axis out of the true vertical whenever any disturbance causes rotation of shafts 27 and 28 within their respective supporting bearings 29 and 30.

The error arising from the frictional torques about the axis through shafts 20 and 21 and about the axis through shafts 27 and 28 are eliminated by the use of the compound ball bearings 22, 23, 29 and 30 when used in conjunction with rotation of the inner gimbal system 24, 31 by motor 37. Referring again to Fig. 4, and assuming that the connected races of compound ball bearings 22 and 23 are driven by motor 43 at a speed such that the balls in the inner bearings are rotated at a speed proportional to $ox$, the minute turning of shafts 20 and 21 in bearings 22 and 23 causes only an infinitesimal increase and decrease in the speed of balls in the bearings 22 and 23. The bearings are operated with ball speeds within the wide range of constant average dynamic friction, so that the bearing friction of bearing 22 applies a constant torque proportional to $cx$ about shaft 20. Similarly, the compound ball bearing 23 stabilizes the frictional torque about shaft 21 at a constant value proportional to $fx$, and therefore a constant torque proportional to $(cx-fx)$ is applied at all times about the axis through shafts 20 and 21.

The effect of any constant disturbing torque acting on a vertical spin axis gyroscope such as 19 is averaged to zero by the rotation of the inner gimbal system 24, 31 about the vertical axis 34, 35. Therefore, since the compound ball bearings apply a constant torque to shafts 20 and 21, which is unchanged by the oscillation of the gimbal ring 24 about the axis through shafts 20 and 21, the effects of friction in bearings 22 and 23 are completely neutralized where the inner gimbal system is simultaneously rotated by motor 37 as described.

The effects due to the friction in bearings 29 and 30 acting on shafts 27 and 28, are neutralized in the same way by driving the connected races of compound bearings 29 and 30 at a speed comparable to $ox$ in Fig. 4, while simultaneously rotating the inner gimbal system 24, 31 with motor 37.

In addition to the friction effect described and also causing a drag on the free rotation of the balls in the bearing, there is the "stiffness" effect caused by minute depressions or "detents" in the races which are due to manufacturing irregularities in which the balls tend to "catch," thus requiring a force to raise or roll the ball out of the depression or detent. This "stiffness" effect is present during small deflections of the shaft mounted within the ball bearing, but, nevertheless causes disturbing torques to be applied to the gyroscope, resulting in unwanted precession of the gyroscope. However, in stabilizing the frictional effects in the ball bearing, the system of the present invention also neutralizes the "stiffness" effects at the same time by keeping the balls constantly in motion so that they cannot come to rest in a detent, thereby averaging the "stiffness" effect to zero.

Although the construction and operation of this invention have been described for a rotating gimbal system gyroscope using ball bearings, it is understood that the precessional errors caused by friction of bearings of any other type such as roller, taper or others that are used in the system can be equally readily neutralized hereunder, and that the invention is susceptible of changes in form and detail within the scope of the appended claims.

I claim:

1. In combination with a gyroscope and a gimbal ring therefor respectively supported for rotation about coordinate axes, each said axis being afforded by a pair of aligned shafts and corresponding bearings carried by corresponding supporting elements therefor, antifriction means interposed between each shaft and its corresponding bearing supporting element, a ring interposed between each shaft and corresponding bearing supporting element and rotatably engaging said means, motive means, operative connections between said motive means and each ring for rotating the latter, and means for simultaneously rotating said gyroscope and gimbal ring bodily about a vertical axis.

2. In combination with a gyroscope and a gimbal ring therefor respectively supported for rotation about coordinate axes, each said axis being afforded by a pair of aligned shafts and corresponding bearings carried by corresponding supporting elements therefor, antifriction means interposed between each shaft of at least one pair and its corresponding bearing supporting element, a ring interposed between each shaft of said pair and corresponding bearing supporting element and rotatably engaging said means, motive means, operative connections between said motive means and each ring for rotating the latter, and means for simultaneously rotating said gyroscope and gimbal ring bodily about a vertical axis.

3. In combination with a gyroscope and a gimbal ring therefor respectively supported for rotation about coordinate axes, each said axis being afforded by a pair of aligned shafts and corresponding bearings carried by corresponding supporting elements therefor, antifriction means interposed between each shaft and its corresponding bearing supporting element, a ring interposed between each shaft and corresponding bearing supporting element and rotatably engaging said means, two motive means, operative connections between one of said motive means and each ring of one pair for rotating the latter, operative connections between the other motive means and each ring of the other pair for rotating the latter, and means for simultaneously rotating said gyroscope and gimbal ring bodily about a vertical axis.

4. In combination with a gyroscope and a gimbal ring therefor respectively supported for rotation about coordinate axes, each said axis being afforded by a pair of aligned shafts and corresponding bearings carried by corresponding supporting elements therefor, two concentric series of rolling bearings engaging each shaft and the corresponding bearing supporting element, respectively, of at least one of said pairs and spaced radially apart in the same plane to form an annular space, a ring interposed in each annular space and engaging both of said rolling bearing series, motive means, operative connections between said motive means and each of said rings for rotating the latter, and means for simultaneously rotating said gyroscope and gimbal ring bodily about a vertical axis.

5. In combination with a gyroscope and a gimbal ring therefor respectively supported for rotation about coordinate axes, each said axis being afforded by a pair of aligned shafts and corresponding bearings carried by corresponding supporting elements therefor, a circular series of rolling bearings encircling the shafts of at least one of said pairs, a second circular series of rolling bearings engaging the corresponding supporting elements of the last-named shafts and lying in the plane of each said first series and spaced annularly therefrom to form a concentric set of spaced bearing series for each shaft and the corresponding bearing supporting element of said pair, a ring interposed in the annular space between each of the said bearing series sets and engaging both bearing series of each set, motive means, operative connections between said motive means and each ring for rotating the latter, and means for simultaneously rotating said gyroscope and gimbal ring bodily about a vertical axis.

GEORGE AGINS.

REFERENCES CITED

The following references are of record in the file of this patent:

UNITED STATES PATENTS

| Number | Name | Date |
|---|---|---|
| 841,612 | Anschutz-Kaempfe | Jan. 15, 1907 |
| 1,386,029 | Rossiter | Aug. 2, 1921 |
| 1,600,071 | Shaifer | Sept. 14, 1926 |
| 1,845,592 | Fieux | Feb. 16, 1932 |
| 2,048,834 | Young | July 28, 1936 |
| 2,410,602 | Davis | Nov. 5, 1946 |
| 2,417,066 | Douglas | Mar. 11, 1947 |

FOREIGN PATENTS

| Number | Country | Date |
|---|---|---|
| 576,073 | France | May 5, 1924 |